Figure 1:
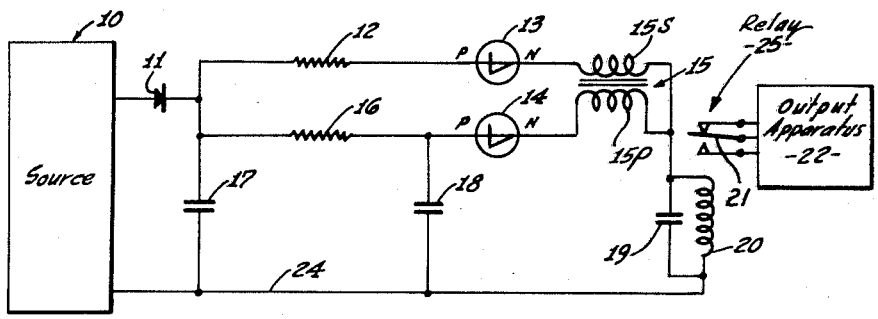

May 12, 1964

H. T. WINCHEL 3,133,204

TIMING CIRCUIT

Filed Dec. 14, 1959

INVENTOR:
Henry T. Winchel
Attorneys 3,133,204
TIMING CIRCUIT
Henry T. Winchel, Culver City, Calif., assignor to Consolidated Electronics Industries Corp., New York, N.Y., a corporation of Delaware
Filed Dec. 14, 1959, Ser. No. 859,308
6 Claims. (Cl. 307—88.5)

This invention relates to timing circuitry and, more particularly, to electronic circuitry for indicating with precision a particular period of time. The invention is especially concerned with electronic circuitry for indicating a particular period during which voltage is applied from a source and for operating a relay at the termination of the particular period.

In many applications, it is desirable or even necessary to measure a period of time with considerable degree of precision. For example, it may be desired in an industrial process to introduce precise amounts of a number of different materials to a mixing chamber so that a product with optimum property is obtained. In order to provide the proper amount of each material in the mixture, it may be necessary to precisely control the duration during which each material is introduced to the mixture.

This invention provides a circuit which measures the duration that voltage is applied from a source and operates a relay which functions as an output member to indicate the termination of a predetermined interval after the application of the voltage from the source to the timing circuit. In one specific illustrative embodiment of the invention, the input voltage is applied to a capacitive circuit arrangement which times the predetermined timing interval. The capacitive circuit arrangement controls the condition of a two-terminal control member which has two impedance conditions. The control member is coupled together with the primary winding of a transformer between the capacitive circuit arrangement and the relay winding. When, after the predetermined interval, the capacitive circuit arrangement provides a predetermined potential, the control member breaks down and assumes its low impedance condition to operate the relay.

The secondary of the transformer is coupled together with a second control member to form a holding circuit for the relay winding. The holding path is coupled between the voltage source and the winding of the relay so that it shunts the capacitive circuit arrangement and the first control member. By means of the transformer, the operation of the first control member developes a biasing potential in the holding circuit for operating the second control member. When the second control member operates, it locks the relay operated and it releases the first control member. The circuit parameters in the holding circuit are such that the second control member does not operate when voltage is applied from the source but requires the additional biasing potential provided by the pulse coupled through the transformer. When the source removes the input voltage, the relay releases substantially instantaneously because the capacitive circuit arrangement is shunted by the holding circuit.

Further features of this invention relate to the provision of means including the control members which provide for an accurate timing period with a wide range of relay parameters. The relay may have a relatively high impedance winding but the accuracy provided by the timing circuit corresponds to the accuracy achieved heretofore utilizing highly sensitive low impedance relays. The timing period is not dependent upon the characteristics of the relay within a wide range of relay parameters.

Figure 2:
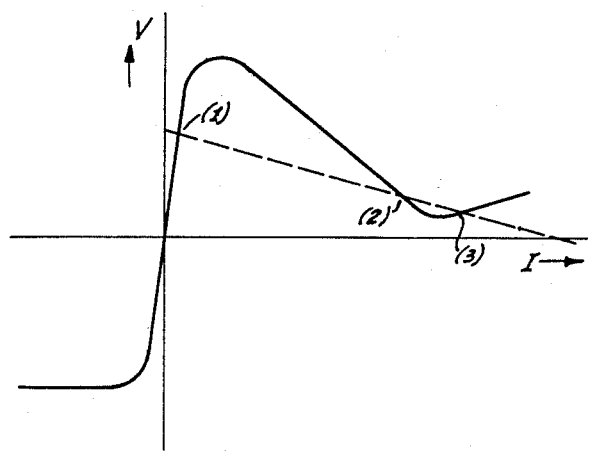

Further advantages and features of this invention will become apparent upon consideration of the following description when read in conjunction with the drawing wherein:

FIGURE 1 is a circuit representation of an electronic timing circuit constituting the illustrative embodiment of this invention; and FIGURE 2 is a graph illustrating the current voltage characteristics of the control members utilized in the timing circuit of this invention.

In the embodiment of the invention illustrated in FIGURE 1, an alternating current signal is applied from a source 10 to initiate the timing operation of the circuit. The signal from the source 10 may have a frequency of 400 cycles and a potential of 115 volts. The signal is rectified by the diode 11 which may be illustratively of the type 1N461 manufactured by the Hughes Aircraft Company. The diode 11 rectifies the alternating current signal from the source 10 and provides a pulsating direct current to a filter capacitor 17 which may, illustratively, have a value of microfarads. The capacitor 17 shunts the higher frequency components of the pulsating direct current to a common or ground connection 24.

The filtered or smoothed potential across the capacitor 17 is applied to two branches: one including a capacitive circuit arrangement and the other including a holding circuit for a winding 20 of a relay 25. The relay winding 20 functions as the output member for the timing circuit and illustratively presents an impedance of 10 kilohms to direct currents. The winding 20 of the relay 25 is magnetically coupled to a switch or armature 21, which is normally positioned adjacent an upper associated contact. When the relay winding 20 is energized, the armature 21 is moved thereby against a lower associated contact. The armature 21 and its two associated contacts are electrically coupled to an output apparatus 22 which recognizes the condition of the armature 21.

The capacitive circuit arrangement, which is coupled to the filter capacitor 17, includes a resistor 16 and a capacitor 18. The resistor 16 may have a suitable value such as 1 megohm and the capacitor 18 may have a suitable value such as 30 microfarads to together provide for a time constant of 30 seconds. The capacitor 18 is connected to the common connection 24. The junction between the resistor 16 and the capacitor 18 is coupled to the terminal P of a two-terminal control member 14.

The other terminal N of the control member 14 is coupled by the primary winding 15P of a transformer 15 to one side of the winding 20 of the relay. The other side of the relay winding 20 is connected to the common connection 24. The control member 14 is one of two control members 13 and 14 included as part of the timing circuit for controlling the operation of the relay.

The control members 13 and 14 may be four layer semi-conductor diodes of the type described by William Shockley in an article on the Unique Properties of a 4-Layer Diode which was published in the Electronics Industries magazine of August 1957. Briefly, the four layer diode is a two-terminal device having two operating conditions: an open or low conductance state corresponding to approximately 100 megohms; or a closed or high conductive state corresponding to approximately 3 ohms. When the voltage across the control member 13 or the control member 14 exceeds a predetermined breakdown potential in the direction indicated by the slanted line in the symbol for the control member, the control member assumes its low impedance condition. The breakdown potential for the control member 14 may illustratively be 20 volts and the control member 13 may be of the type 4N20D manufactured by the Shockley Semi-Conductor Laboratories. The breakdown potential for the control member 13 is somewhat greater illustratively at 30 volts, and the control member 13 may be of the type 4N30D manufactured by the Shockley Semi-Conductor Laboratories. FIGURE 2 illustrates a typical load line for the 4-layer diodes 13 and 14. The two outer intersections 1 and 3 are stable and the middle intersection 2 is unstable. When the breakdown potential is exceeded, the condition of the four layer diode is changed from that indicated by intersection 1 to that indicated by intersection 3. As indicated by the curve in FIGURE 2, the slope of the current voltage characteristic is considerably smaller at the intersection 3 than at the intersection 1. The impedance presented at these two conditions is, therefore, quite different with the impedance at the intersection 3 being quite smaller.

With the breakdown potential of the control member 14 being 20 volts, the control member 14 does not assume its low impedance condition until the capacitor 18 charges to the potential of 20 volts. When, after an interval determined by the time constant of the capacitive arrangement, the potential across the control member 14 exceeds 20 volts, the control member 14 breaks down assuming its low impedance condition and establishing an operating path for the relay winding 20. The operating path is from the capacitor 18 through the control member 14 and the primary winding 15P of a transformer 15 to the relay winding 20. The winding 20 of the relay 25 is shunted by a capacitor 19 which may have a value of 0.01 microfarad. The initial surge of current through the operating path is, therefore, shunted about the relay winding 20. When the capacitor 19 charges, the relay winding 20 becomes sufficiently energized to operate the magnetically coupled armature 21.

When the control member 14 is operated to its low impedance condition it, provides a surge of current through the primary winding 15P of the transformer 15 to develop a biasing potential across its secondary winding 15S. The secondary winding 15S may have the same number of turns as the primary winding 15P. The secondary winding 15S is included as part of the holding circuit briefly mentioned above for the relay winding 20. The holding circuit also includes the second control member 13 and a resistor 12 which may have a suitable value such as 10 kilohms. When the signal is applied from the source 10, the potential developed across the control member 13 is insufficient to operate it to its low impedance condition. As indicated above, the breakdown potential of the control member 13 is greater than that of the control member 14. The biasing potential developed across the secondary winding 15S, responsive to the operation of the control member 14, is in a direction to aid the originally applied potential from the source 10. The biasing potential is accordingly relatively negative at terminal N of the control member 13. With the positive input potential at its terminal P and the negative biasing potential at its terminal N, the control member 13 breaks down to complete a low impedance holding or locking circuit for the relay winding 20.

The low impedance holding circuit performs a dual function in that it also shunts the capacitive circuit arrangement and the control member 14. With a low impedance path across these components, the potential provided across the control member 14 is insufficient to provide a sustaining current therethrough and after a predetermined interval, it returns to its normal high impedance condition. Actually, when the impedance of the holding circuit reduces, the potential across the winding 20 increases so that the capacitor 18 discharges to a higher potential. The difference of potential across the control member 14 accordingly becomes quite small so that it returns to its original condition. The control member 13, in this manner, provides for a dual function in that it establishes a holding circuit for the relay winding 20 and in that it also restores the control member 14 to its original condition. Due to the effect of the transformer 15, the control member 13 breaks down substantially at the same time as the control member 14. The surge of the currents through both control members 13 and 14 very quickly charges the capacitor 19 and energizes the relay winding 20. The capacitor 19 provides for a very small delay in energizing the relay winding 20 to insure that the control member 13 is operated. The relay winding 20, in this manner, may be a high impedance relay with the surge of currents insuring its exact timing operation.

When the input alternating potential is removed by the source 10, the relay winding 20 becomes substantially instantaneously deenergized to release the armature 21. If a holding circuit were not utilized, the release, as well as the operation, of the relay 25 would be controlled by the capacitive circuit arrangement. The release of the relay 25 would, accordingly, be time delayed.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A timing circuit, including, a source of operating potential, a capacitive circuit arrangement coupled to said source for developing a first particular potential after a particular timing interval, an output member having operative and inoperative states, a static two-condition member having a normal high impedance condition and an operative low impedance condition, means including said static two-condition member operatively coupled between said capacitive circuit arrangement and said output member, said static two-condition member being operated in response to said first particular potential from said capacitive circuit arrangement to provide a low impedance path for said output member whereby said output member is operated in its operative state, said means including said static two-condition member being operative to produce a second particular potential upon the operation of said two-condition member in the high impedance condition and to produce a third particular potential upon the operation of said two-condition member in the low impedance condition; and a static holding circuit for said output member, the static holding circuit being coupled between said source and said output member, the static holding circuit being operatively coupled to the static two-condition member and being operative only upon the introduction across the static holding circuit of a fourth particular potential greater than the potential from the source, the static holding circuit being responsive to the production of the second particular potential by means including said two-condition member in the low impedance condition of the two-condition member for combining the third particular potential with the operating potential from the source to obtain the introduction of the fourth particular potential across the static holding circuit to produce a low impedance path to said output member and also to shunt said static two-condition member for the return of the static two-condition member to its normal high impedance condition.

2. A timing circuit, including, a source of operating potential, a capacitive circuit arrangement coupled to said source for developing a particular potential after a particular timing interval, an output member having operative and inoperative states, a first static two-condition member having a normal high impedance condition and an operative low impedance condition, said first static two-condition member being coupled between said capacitive circuit arrangement and said output member, said first static two-condition member being operated responsive to said particular potential from said capacitive circuit arrangement to provide a low impedance path for said output member whereby said output member is operated in the operative condition, and a holding circuit for said output member, said holding circuit being coupled between said source and said output member, said holding circuit being responsive to the operation of said first static two-condition member in the low impedance condition for providing a low impedance path to said output member and also for shunting said first static two-condition member to return said first static two-condition member to the normal high impedance condition, said holding circuit including a second static two-condition member having a normal high impedance condition and an operative low impedance condition, said second static two-condition member being provided with characteristics to become operative in the low impedance condition upon the production of a particular voltage to complete the holding circuit to the output member where the particular potential is greater than the voltage from the source, and means serially connected with said second static two-condition member and responsive to the production of the low impedance condition in the first static two-condition member to obtain the introduction of the particular voltage to the second static two-condition member.

3. A timing circuit, including, an output device having operative and inoperative states, a source of potential having a first particular magnitude, a capacitive circuit arrangement connected to the source of potential to receive the potential from the source, a first static two-condition member coupled to said capacitive circuit arrangement, the first static two-condition member normally having a first operating condition and operative in a second operative condition upon the introduction to the first static two-condition member of a first particular breakdown potential which is less than the first particular magnitude of the potential from said source, the first static two-condition member being connected to the output device to obtain the operation of the output device in the operative state upon the occurrence of the second operative condition in the first static two-condition member, a holding circuit for the output device, the holding circuit including a second static two-condition member normally having a first operating condition and operative in a second operative condition upon the introduction to the second static two-condition member of a second particular breakdown potential which is greater than the first particular magnitude of the potential from said source, the second static two-condition member being connected to the output device to obtain an operation of the output device in the operative state upon a change in the operation of the second static two-condition member from the first operating condition to the second operating condition, and means operatively coupled to said first and second two-condition members for developing a biasing potential for operating said second two-condition member from its first operating condition to its second operating condition in accordance with the operation of said first two-condition member from its first operating condition to its second operating condition.

4. A timing circuit, including, a source of operating potential, a capacitive circuit arrangement coupled to said source for developing a particular potential after a particular timing interval, an output member having operative and inoperative states, a first static two-condition member having a normal high impedance condition and an operative low impedance condition, said first static two-condition member being coupled between said capacitive circuit arrangement and said output member, said first static two-condition member being operated responsive to said particular potential from said capacitive circuit arrangement to provide a low impedance path for said output member whereby said output member is operated in the operative state, and a holding circuit for said output member, the holding circuit being coupled between said source and said output member, the holding circuit being responsive to the operation of said first static two-condition member in the low impedance condition for providing a low impedance path to said output member and also for shunting said first static two-condition member to return said first static two-condition member to the normal high impedance condition, said holding circuit including a second static two-condition member having a normal high impedance condition and an operative low impedance condition, said second static two-condition member being responsive to a particular operating potential of greater magnitude than the magnitude of said particular potential for changing the second static two-condition member from the high impedance condition to the low impedance condition, and impedance means serially connected with said second static two-condition member of said holding circuit, the impedance means being responsive to the change of the first static two-condition member from the high impedance condition to the low impedance condition for producing the particular operating potential in the holding circuit to obtain a change in the second static two-condition member from the high impedance condition to the low-impedance condition.

5. A timing circuit, including, an output device having operative and inoperative states, a source of potential having a particular magnitude, a capacitive circuit arrangement for receiving the potential from the source, a first static two-condition member coupled to said capacitive circuit arrangement and having a particular breakdown potential which is smaller than the particular magnitude of the potential from said source for operating the output device in the operative state, a holding circuit for the output device, the holding circuit including a second static two-condition member having a particular breakdown potential which is larger than the particular magnitude of the potential from said source, and a transformer having a primary winding connected in series with said first two-condition member and the output device, the transformer also having a secondary winding included in the holding circuit and connected to said second two-condition member and to said output device for developing the particular breakdown potential in the second static two-condition member upon the breakdown of the first static two-condition member.

6. A timing circuit, including, a source of operating potential, a capacitive circuit arrangement coupled to said source for developing a first particular potential after a particular timing interval, an output member having operative and inoperative states, a first two-condition semi-conductor member having a normal high impedance condition and an operative low impedance condition, said first two-condition semi-conductor member being coupled between said capacitive circuit arrangement and said output member, the first two-condition semi-conductor member being operated in the low impedance condition in response to said first particular potential from said capacitive circuit arrangement to provide a low impedance path for said output member whereby said output member is operated in the operative state, and a holding circuit for said output member, the holding circuit being coupled between said source and said output member, the holding circuit being responsive to the operation of said first two-condition semi-conductor member in the low impedance condition for providing a low impedance path to said output member and also for shunting said first two-condition semi-conductor member to return said first two-condition semi-conductor member to the normal high impedance condition, said holding circuit including a second two-condition semi-conductor member having a normal high impedance condition and an operative low impedance condition, the second two-condition semi-conductor member being operative from the high impedance condition to the low impedance condition in response to a second particular potential greater than the first particular potential from the capacitive circuit arrangement, and a transformer magnetically coupling said first semi-conductor member to said second semi-conductor member in said holding circuit for developing the second particular potential at said second two-condition semi-conductor member in response to the operation of said first semi-conductor member in the low impedance condition.

References Cited in the file of this patent

UNITED STATES PATENTS

| | | |
|---|---|---|
| 2,433,254 | Aiken | Dec. 23, 1947 |
| 2,567,928 | Farmer | Sept. 18, 1951 |
| 2,759,124 | Willis | Aug. 14, 1956 |
| 3,018,419 | Bonn | Jan. 23, 1962 |